United States Patent
Imine

(10) Patent No.: US 9,219,831 B2
(45) Date of Patent: Dec. 22, 2015

(54) IMAGE FORMING APPARATUS THAT RECEIVES OPERATION SETTINGS FOR JOB EXECUTION FROM MULTIPLE OPERATION UNITS, AND CONTROL METHOD AND STORAGE MEDIUM THEREFOR

(71) Applicant: CANON KABUSHIKI KAISHA, Tokyo (JP)

(72) Inventor: Ryotaro Imine, Machida-shi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 71 days.

(21) Appl. No.: 13/899,777

(22) Filed: May 22, 2013

(65) Prior Publication Data
US 2014/0002838 A1    Jan. 2, 2014

(30) Foreign Application Priority Data

Jun. 29, 2012 (JP) ................................. 2012-146877

(51) Int. Cl.
*G06F 15/00* (2006.01)
*G06F 3/12* (2006.01)
(Continued)

(52) U.S. Cl.
CPC ......... *H04N 1/00228* (2013.01); *H04N 1/0023* (2013.01); *H04N 1/0048* (2013.01); *H04N 1/00222* (2013.01); *H04N 1/00408* (2013.01); *H04N 1/00472* (2013.01); *H04N 1/00954* (2013.01); *H04N 2201/0094* (2013.01)

(58) Field of Classification Search
CPC ............. H04N 1/0048; H04N 1/00954; G06F 3/1236; G06F 3/1239; G06F 3/1285; G06F 3/1267

USPC .................................................. 358/1.13–1.16
See application file for complete search history.

(56) References Cited

U.S. PATENT DOCUMENTS 5,668,936 A * 9/1997 Motooka et al. ............. 358/1.15
6,369,906 B1 * 4/2002 Nakao .......................... 358/1.15
(Continued)

FOREIGN PATENT DOCUMENTS

JP      2004-215009 A      7/2004

OTHER PUBLICATIONS

Hori Seijiro, Print Controller, Program and Recording Medium, Jun. 14, 2007, JP2007-148803, English Translation.*
(Continued)

*Primary Examiner* — Douglas Tran
(74) *Attorney, Agent, or Firm* — Rossi, Kimms & McDowell LLP

(57) ABSTRACT

An image forming apparatus capable of executing functions thereof corresponding to operation setting requests in the order of receptions of the requests, while taking into account of the presence/absence of conflict between the operation setting requests, even when receiving a plurality of operation setting requests from an operation unit of the image forming apparatus and/or an external operation unit such as a portable terminal. When operation setting requests are respectively received from the operation unit of the image forming apparatus and the portable terminal, it is determined whether there is a conflict between resources used by the image forming apparatus to execute jobs and whether a user who operates the operation unit and a user who operates the portable terminal are the same as each other. Only the operation setting request permitted based on results of the determinations is received.

8 Claims, 10 Drawing Sheets

(51) Int. Cl.
*G06K 1/00* (2006.01)
*H04N 1/00* (2006.01)

(56) References Cited

U.S. PATENT DOCUMENTS

2002/0093675 A1* 7/2002 Matsuda ................. 358/1.15
2003/0210416 A1* 11/2003 Lewis et al. ............. 358/1.13
2009/0207441 A1* 8/2009 Kotaka ..................... 358/1.15
2014/0247462 A1* 9/2014 Saitoh et al. ............. 358/1.15

OTHER PUBLICATIONS

Kojima Satoshi, Print INformation Processor, Printing System and Program, Apr. 30, 2009, JP2009-093406 English Translation.*

* cited by examiner

FIG.12A

| CURRENTLY EXECUTED JOB OR OPERATION | JOB OR OPERATION TO BE SUBSEQUENTLY EXECUTED | PRESENCE/ ABSENCE OF CONFLICT |
|---|---|---|
| COPY | COPY | PRESENCE OF CONFLICT |
| COPY | SCAN | PRESENCE OF CONFLICT |
| COPY | BOXSEND | ABSENCE OF CONFLICT |
| COPY | PRINT | ABSENCE OF CONFLICT |
| COPY | FAX | PRESENCE OF CONFLICT |
| SCAN | PRINT | ABSENCE OF CONFLICT |
| ADDRESS BOOK EDITING | ADDRESS BOOK EDITING | PRESENCE OF CONFLICT |
| BOX IMAGE EDITING | BOXSEND | PRESENCE OF CONFLICT |

FIG.12B

| RESERVATION ORDER | USER ID | RESERVED OPERATION |
|---|---|---|
| 1 | A | COPY |
| 2 | B | FAX |
| 3 | C | COPY |
| 4 | D | SCAN |
| 5 | | |
| 6 | | |
| 7 | | |
| 8 | | |
| 9 | | |
| 10 | | |

IMAGE FORMING APPARATUS THAT RECEIVES OPERATION SETTINGS FOR JOB EXECUTION FROM MULTIPLE OPERATION UNITS, AND CONTROL METHOD AND STORAGE MEDIUM THEREFOR

BACKGROUND OF THE INVENTION

1. Field of the Invention

The present invention relates to an image forming apparatus, a control method therefor, and a storage medium storing a program for executing the control method.

2. Description of the Related Art

Some image forming apparatuses such as printers, facsimile machines, and multi-function peripherals have a push scan function and a pull scan function. An operation setting of the push scan function is set through an operation unit of an image forming apparatus, and an operation setting of the pull scan function is set through an operation unit of an external device (hereinafter, referred to as the external operation unit). When the operation setting of the push or pull scan function is made, the image forming apparatus receives an operation setting request, scans an original to generate image data, and transmits the image data to the external device.

Recently, portable terminals such as smart phones and tablet PCs have been in widespread use that are excellent in operability, response, and/or visibility. In the field of image formation, attempts have been made to use portable terminals as external operation units for image forming apparatuses. For example, to improve the user-friendliness, there are attempts to simplify the operation setting to the image forming apparatus by using intuitive operation such as gesture input performed via a touch panel of the portable terminal and to display an image in detail by using excellent visibility of the portable terminal.

In an operation environment where an image forming apparatus can be operated from portable terminals of plural users, there is a possibility that the image forming apparatus successively receives operation setting requests from the operation unit of the image forming apparatus and/or the portable terminals. This can cause a problem. In a case, for example, that the operation setting of the push scan function is set through the operation unit of the image forming apparatus and the image forming apparatus receives an operation setting request of pull scan function from one of the portable terminals (external devices), there is a fear that an image of an original of a user utilizing the push scan function is delivered to another user utilizing the pull scan function.

Japanese Laid-open Patent Publication No. 2004-215009 discloses an image data transmission system in which when the operation setting of push scan function is set through an operation unit of an image forming apparatus (MFP), control is made to refuse to receive an operation setting request from an external device, thereby preventing an image of original of a user utilizing the push scan function from being delivered to a third party utilizing the pull scan function.

However, with the above-described exclusive control where the operation setting request from the external device is refused to be received when the operation setting is made through the operation unit of the image forming apparatus, the operation setting request of pull scan function from the external device is refused until completion of a push scan operation of the image forming apparatus. As a result, the user who has made the operation setting request from the external device is obliged to wait for a long time, and there is a possibility that the pull scan function whose operation setting is first set from the external device is executed after execution of the pull scan function whose operation setting is subsequently set through the operation unit of the image forming apparatus.

In both the case of executing the push scan function and the case of executing the pull scan function, an ADF (auto document feeder) of the image forming apparatus is used. In other words, a resource conflict occurs in the image forming apparatus. The above-described exclusive control must be made in this case. However, if the exclusive control is performed when a resource conflict does not occur, the operating rate of the image forming apparatus is lowered.

SUMMARY OF THE INVENTION

The present invention provides an image forming apparatus capable of executing functions thereof corresponding to operation setting requests in the order of receptions of the requests, while taking into account of the presence/absence of a conflict between the operation setting requests, even when receiving a plurality of operation setting requests from an operation unit of the image forming apparatus and/or an external operation unit such as a portable terminal, and provides a control method for the image forming apparatus and a storage medium storing a program for executing the control method.

According to one aspect of this invention, there is provided an image forming apparatus that receives operation settings set through a plurality of operation units and executes jobs, comprising a user determination unit configured, in a case where it receives a plurality of operation settings from the plurality of operation units, to determine whether or not a plurality of users who have set the plurality of operation settings are same as one another, an operation setting determination unit configured to determine whether or not the plurality of operation settings are in a conflict relationship with one another, and an operation permission judgment unit configured to determine, based on a result of the determination by the user determination unit and a result of the determination by the operation setting determination unit, whether or not each of the received operation settings should be permitted, wherein in a case where the user determination unit determines that the plurality of users who have set the plurality of operation settings are not the same as one another and the operation setting determination unit determines that the plurality of operation settings are in a conflict relationship with one another, the operation permission judgment unit refuses each of at least one subsequently received operation setting.

With this invention, even when a plurality of operation setting requests are received from the operation unit of the image forming apparatus and/or the external operation unit such as a portable terminal, apparatus functions corresponding to the operation setting requests can be executed in the order of receptions of the requests, while taking into account of the presence/absence of a conflict between the operation setting requests.

Further features of the present invention will become apparent from the following description of an exemplary embodiment with reference to the attached drawings.

BRIEF DESCRIPTION OF THE DRAWINGS

FIG. 12A is a view showing an example of a conflict relationship determination table for use by a job content determination unit of the image forming apparatus to determine a conflict relationship between resources of the image forming apparatus that are used to execute plural jobs; and FIG. 12B is a view showing an example of an operation reservation information table into which operation reservation information is registered when there is a conflict between apparatus resources.

DESCRIPTION OF THE EMBODIMENTS

The present invention will now be described in detail below with reference to the drawings showing a preferred embodiment thereof.

Figure 1:
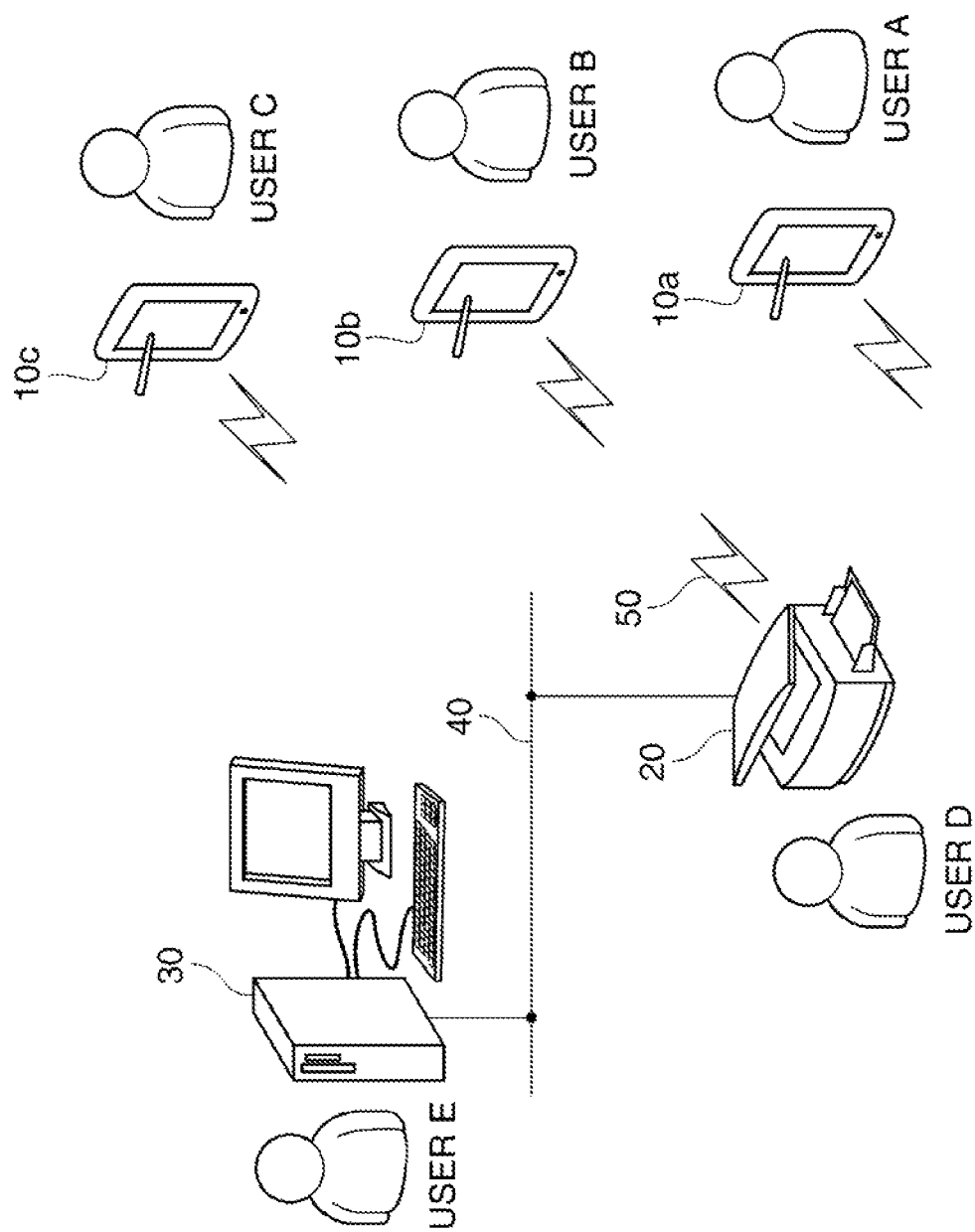
FIG. 1 is a view showing an example environment in which an image forming apparatus according to one embodiment of this invention is utilized.

FIG. 1 shows an example environment in which an image forming apparatus according to one embodiment of this invention is utilized.

In FIG. 1, reference numerals 10a, 10b, and 10c denote portable terminals of users A, B, and C, respectively. Hereinafter, the portable terminals 10a, 10b, 10c will each be sometimes denoted by reference numeral 10 without distinction therebetween. Reference numeral 20 denotes an image forming apparatus that is implemented by e.g. a multi-function peripheral and connected to a general-purpose computer 30 via a wired network 40 such as a LAN (local area network). The general-purpose computer 30 transmits print data or the like to the image forming apparatus 20 via the wired network 40.

The portable terminals 10a, 10b, and 10c can be used as external operation units for the image forming apparatus 20. More specifically, according to operations by the users A, B, and C, the portable terminals 10a, 10b, and 10c each transmit an operation setting request or an instruction for execution of copy job, FAX job, or the like.

The image forming apparatus 20 receives the operation setting request or the job execution instruction via a wireless network 50, and performs a desired operation. The image forming apparatus 20 also receives an operation instruction input by a user D through an operation unit of the image forming apparatus 20 and performs a predetermined operation. Furthermore, the image forming apparatus 20 receives via the wired network 40 an operation instruction that is transmitted from an operation unit of the general-purpose computer 30 according to an operation by a user E, and performs a predetermined operation.

Figure 2:
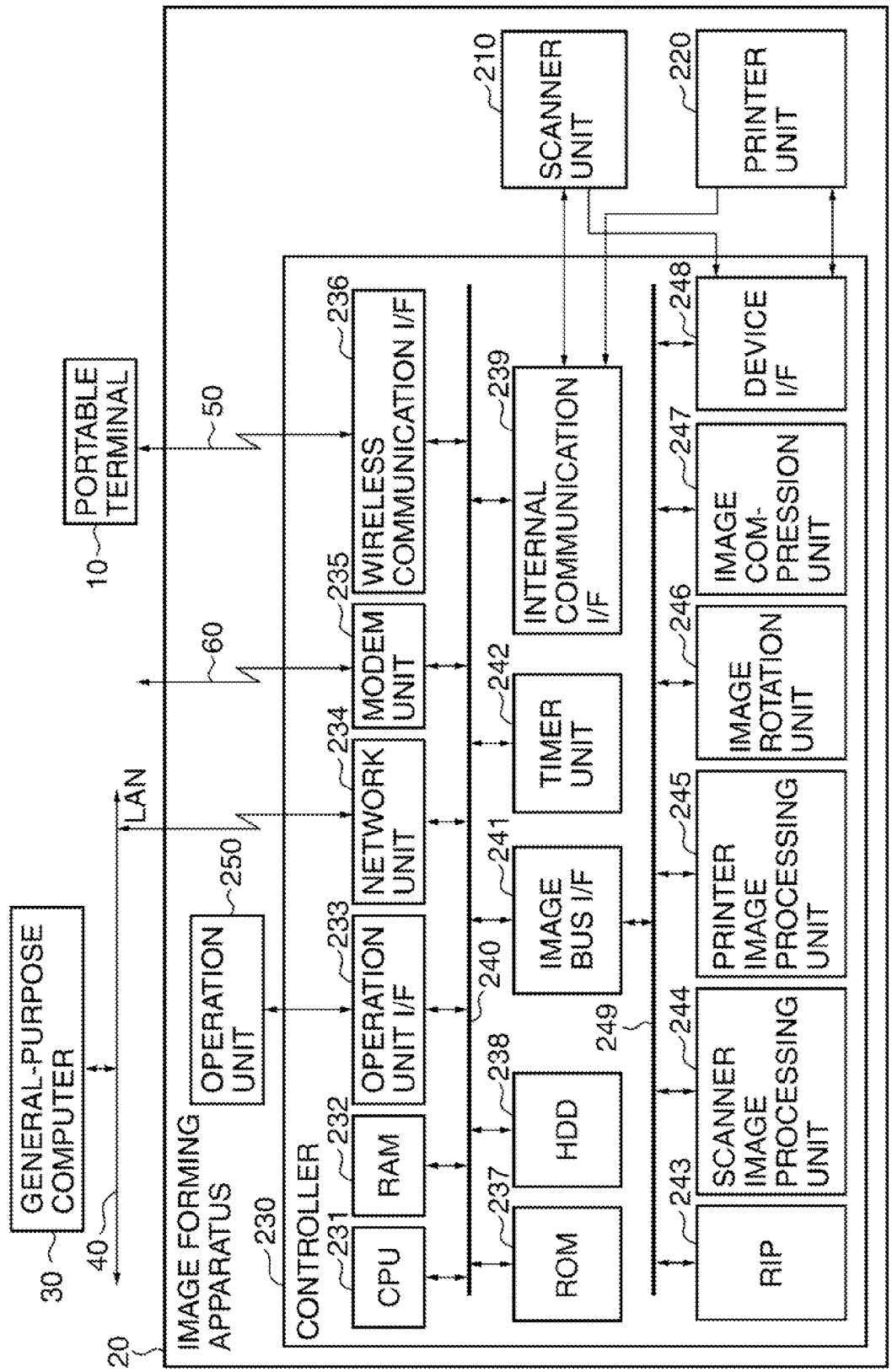
FIG. 2 is a block diagram showing an example of hardware structure of the image forming apparatus.

FIG. 2 shows in block diagram an example of hardware structure of the image forming apparatus 20.

The image forming apparatus 20 has an operation unit 250 for use by the user D to perform various operations, a scanner unit 210 for reading an image of an original according to an instruction from the operation unit 250 to thereby obtain image data, a printer unit 220 for printing image data on a sheet, and a controller 230 for controlling the scanner unit 210, the printer unit 220, etc.

The scanner unit 210 has a CPU for controlling the scanner unit 210, and also has an illumination lamp and scan mirrors (not shown) for reading an original. The printer unit 220 has a CPU for controlling the printer unit 220, and also has a photosensitive drum, a fixing device, etc. (not shown) for image formation and image fixing. The controller 230 is connected to the scanner unit 210, printer unit 220, wired network 40, wireless network 50, and public line (WAN) 60.

The controller 230 has a CPU 231 serving as a control unit that overall controls the entire image forming apparatus 20. A RAM 232 is a system work memory for use by the CPU 231 for its operation, and also serves as an image memory that temporarily stores image data.

An operation unit I/F 233 is an interface with the operation unit 250. The operation unit I/F 233 outputs to the operation unit 250 image data to be displayed on the operation unit 250, and transmits to the CPU 231 information input by the user D through the operation unit 250.

A network unit 234 communicates with the general-purpose computer 30 and communicates with a computer terminal (not shown) on the wired network 40. A modem unit 235 transmits and receives data to and from a external facsimile apparatus (not shown) through the public line 60. A wireless communication I/F 236 is connected through the wireless network 50 to the portable terminal 10 or the like.

A ROM 237 is stored with a boot program for execution by the CPU 231. A hard disk drive (HDD) 238 is stored with system software, image data, software counter value, etc. The controller 230 causes the HDD 238 or the RAM 232 to store output attribute information for execution of print job or copy job (such as user name, number of copies of print, color printing) in the form of a job log, and manages the output attribute information.

Reference numeral 239 denotes an internal communication I/F that communicates with the scanner unit 210 and with the printer unit 220. Reference numeral 240 denotes a system bus. Reference numeral 241 denotes an image bus I/F, which is a bus bridge through which the system bus 240 and the image bus 249 are connected to each other and by which data structure is converted. Reference numeral 242 denotes a timer unit for detecting time.

The controller 230 also includes a raster image processor (RIP) 243 that develops a PDL code contained in a print job received from the general-purpose computer 30 on the wired network 40 into a bitmap image, a scanner image processing unit 244 that performs correction, modification, and editing on image data input from the scanner unit 210, and a printer image processing unit 245 that performs correction, resolution conversion, etc. on image data output from (printed by) the printer unit 220.

The controller 230 further includes an image rotation unit 246 that performs rotation of image data, an image compression unit 247 that performs predetermined compression/decompression processing on image data, and a device I/F 248 that connects the scanner unit 210 and the printer unit 220 to the controller 230 and that performs synchronous/asynchronous conversion of image data.

It should be noted that the image forming apparatus 20 is not limited to the multi-function peripheral shown in FIG. 2, and can be other apparatus such as a printer or a scanner.

Figure 3:
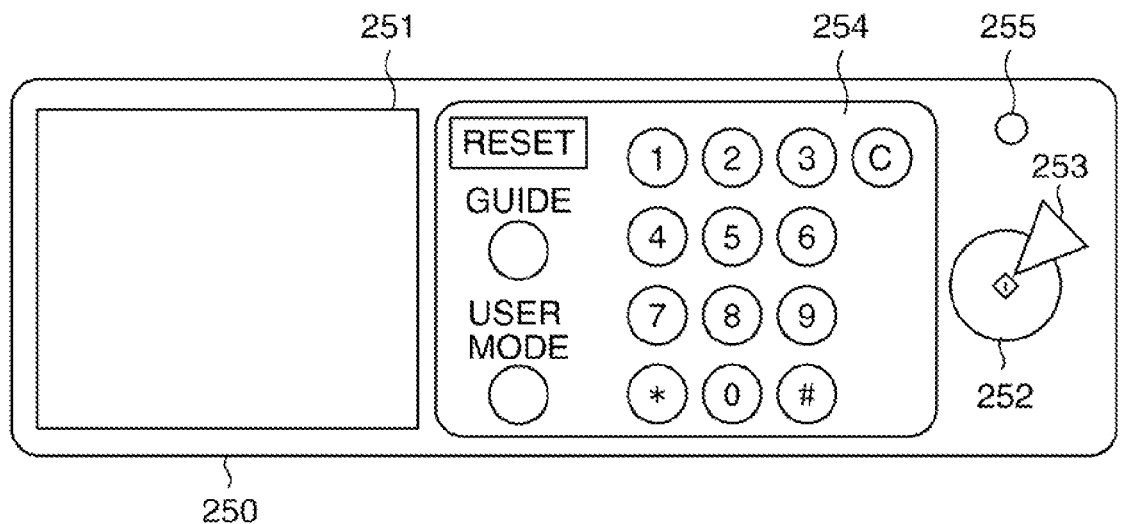
FIG. 3 is a view showing an example of appearance construction of an operation unit of the image forming apparatus.

FIG. 3 shows an example of appearance construction of the operation unit 250 of the image forming apparatus 20.

The operation unit 250 has an operation panel 251, which is an input device configured by a combination of a liquid crystal panel and a touch pad. A user can input information required for job preparation (such as user name, number of copies of print, output attribute) by pressing keys displayed on a screen of the operation panel 251. The input information is transmitted from the operation unit 250 to the operation unit I/F 233 of the controller 230.

A start key 252 is used to give an instruction to start reading an image of original, an instruction to start a printing operation, or the like. The start key 252 has LEDs of two colors (green and red). The green color LED is lit to indicate that image reading can be started, whereas the red color LED is lit to indicate that image reading cannot be started. A stop key 253 functions to stop operation of the image forming apparatus, which is in operation. For example, when the stop key 253 is pressed during an operation of reading an image of original, the reading operation is stopped.

A hard key group 254 has ten keys, clear key, reset key, guide key, and user mode key. A power saving key 255 is used to shift the image forming apparatus 20 from a normal mode to a sleep mode and used to return it to the normal mode from the sleep mode.

Figure 4:
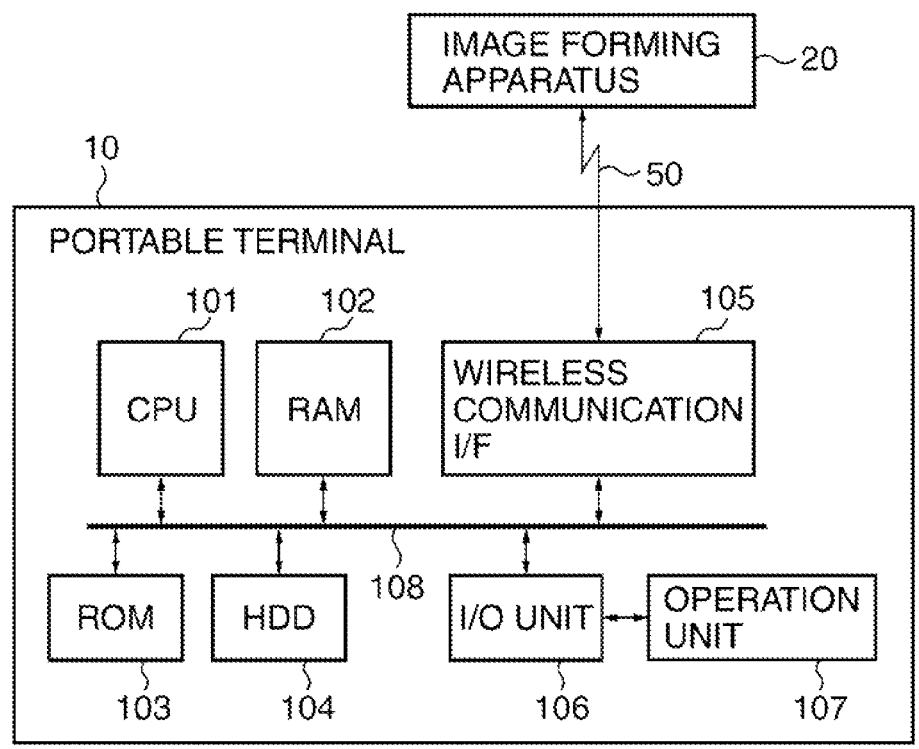
FIG. 4 is a view showing an example of hardware structure of a portable terminal.

FIG. 4 shows an example of hardware structure of the portable terminal 10. It is assumed here that the portable terminals 10a to 10c are the same in hardware structure from one another. However, it is unnecessary for the portable terminals to have the same hardware structure as one another, if they each have the basic structure shown in FIG. 4.

The portable terminal 10 includes a CPU 101, RAM 102, ROM 103, HDD 104, wireless communication I/F 105, I/O unit 106, operation unit 107, and system bus 108.

The CPU 101 reads programs such as an OS (operating system) and application software from the HDD 104 and executes the programs, thereby performing control. The RAM 102 is a system work memory for use by the CPU 101 for program execution. The ROM 103 is stored with a BIOS (basis input output system), a program for starting the OS, and setting files. The HDD 104 is stored with system software and the like.

The wireless communication I/F 105 performs data communication with an external device such as the image forming apparatus 20 via the wireless network 50 such as a wireless LAN. The I/O unit 106 is an interface for inputting and outputting information from and to the operation unit 107, which is constituted by, e.g., input/output devices and a liquid crystal display with multi-touch sensors. The operation unit 107 creates e.g. a GUI (graphical user interface) screen based on screen information supplied from the CPU 101, and displays various windows, data, etc. which are required for operation.

Figure 5:
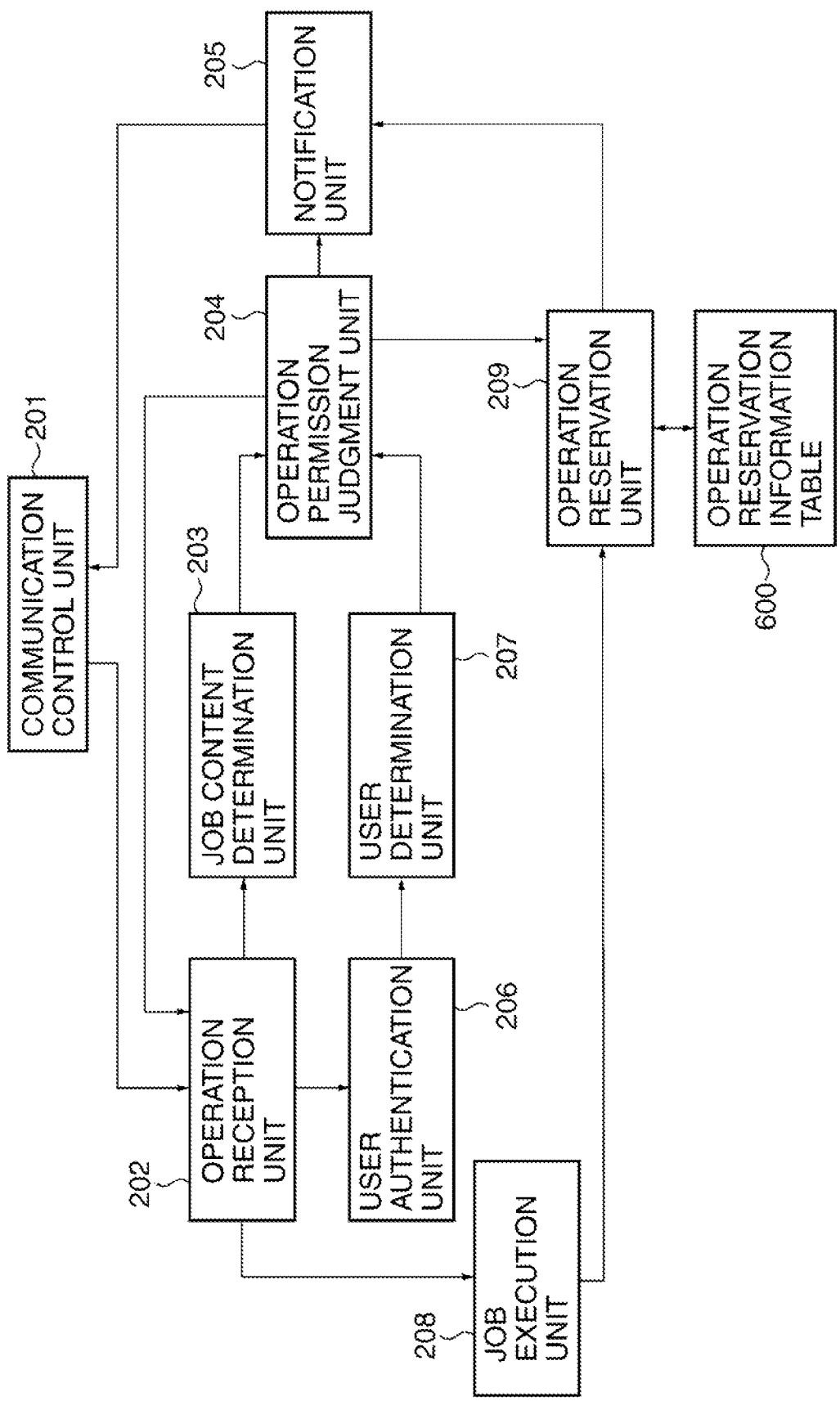
FIG. 5 is a view schematically showing software structure of the image forming apparatus for executing an operation reception process.

FIG. 5 schematically shows software structure of the image forming apparatus 20 for executing an operation reception process.

As shown in FIG. 5, the image forming apparatus 20 includes software modules 201 to 209 running on the CPU 231. Functions of these software modules are realized by the CPU 231 of the image forming apparatus 20 by reading out a program stored in the HDD 238 to the RAM 232 and by executing the program.

A communication control unit 201 performs communication control relating to reception of operation setting information transmitted from the portable terminal 10, reception of user authentication information, and transmission of information to the portable terminal 10. The operation setting information represents a function selected by the user from among various functions of the image forming apparatus 20 such as a copy function, a scanning and transmission function, and a FAX transmission function. The user authentication information includes e.g. user identification information (such as a user ID) and password information.

An operation reception unit 202 receives either operation setting information, which is input through the operation of the operation unit 250 of the image forming apparatus 20, or operation setting information, which is received from the portable terminal 10 and then input from the communication control unit 201. The operation setting information received by the operation reception unit 202 is transmitted from the operation reception unit 202 to a job content determination unit 203 and to a job execution unit 208.

The job content determination unit 203 is an example of operation setting determination unit. When receiving the operation setting information from the operation reception unit 202, the job content determination unit 203 determines whether or not the operation setting is in a conflict relationship with previous operation setting. To this end, the job content determination unit 203 determines whether or not there is a conflict in at least one of hardware resources and software resources of the image forming apparatus when one or more resources are used for execution of plural jobs or operations relating to plural pieces of operation setting information successively transmitted from the operation reception unit 202.

For simplicity of description, there will be described a case where a conflict relationship between resources used for execution of two jobs or operations is determined. It should be noted that the number of jobs whose conflict relationship is to be determined is not limited to two but may be three or more.

FIG. 12A shows an example of a conflict relationship determination table for use by the job content determination unit 203 to determine a resource-conflict relationship.

As shown in FIG. 12A, the conflict relationship determination table 500 has a field 501 in which a currently executed job or operation is indicated, a field 502 in which a job or operation to be subsequently executed is indicated, and a field 503 in which the presence/absence of a conflict relationship between these jobs is indicated.

When receiving operation setting information from the operation reception unit 202, the job content determination unit 203 determines whether or not there is a conflict relationship between two jobs respectively relating to operation setting and preceding operation setting based on the operation setting information and preceding operation setting information, while referring to the conflict relationship determination table 500 shown in FIG. 12A.

In a case, for example, that the "currently executed job or operation (preceding job or operation)" represented by the preceding operation setting information is a COPY operation and the "job or operation to be subsequently executed" represented by the operation setting information received from the operation reception unit 202 is a COPY operation, the job content determination unit 203 refers to the first line of the determination table 500 whose fields 501, 502 are both stored with information "COPY," and determines that there is a conflict relationship between the two jobs based on information "presence of conflict" stored in the field 503 of the first line. In other words, both the jobs are executed while utilizing the same hardware resource (scanner unit 210), and therefore these jobs are in a conflict relationship.

In another case where the "currently executed job or operation" is a COPY operation and the "job or operation to be subsequently executed" is a BOXSEND operation, the job content determination unit 203 determines, based on information "absence of conflict" stored in the field 503 of third line of the table 500 whose fields 501, 502 are respectively stored with information "COPY" and information "BOXSEND," that there is no conflict relationship between the two jobs. The BOXSEND operation that transmits data stored in the HDD 238 to the external device does not utilize the hardware resource (scanner unit 210) used for execution of the copy job, and therefore these jobs are not in a conflict relationship.

In still another case where both the "currently executed job or operation" and the "job or operation to be subsequently executed" are address book editing, the job content determination unit 203 determines, based on information "presence of conflict" stored in the field 503 of the seventh line of the table 500 whose fields 501, 502 are both stored with information "address book editing," that the two jobs are in a conflict relationship. These jobs each performing an operation for editing recording data while utilizing the same software resource are in a conflict relationship.

The job content determination unit 203 of FIG. 5 notifies a result of the above-described determination (i.e., the presence or absence of conflict relationship between operation settings) to an operation permission judgment unit 204.

A user authentication unit 206 authenticates a user who has performed the operation input that has been received by the operation reception unit 202, and transmits user authentication information representing a result of the authentication to a user determination unit 207.

Based on the user authentication information transmitted from the user authentication unit 206, the user determination unit 207 determines whether or not a user corresponding to the operation setting information first received and a user corresponding to the operation setting information subsequently received are the same as each other, and transmits a result of the determination to the operation permission judgment unit 204. For example, it is determined whether or not a user who first transmitted the operation setting information while utilizing the operation unit 250 of the image forming apparatus and a user who subsequently transmitted the operation setting information while utilizing the portable terminal 10 are the same as each other.

Based on the result of the resource-conflict determination by the job content determination unit 203 and the result of the user authentication determination by the user determination unit 207, the operation permission judgment unit 204 determines whether the operation should be permitted or refused to be received. To permit reception of the operation, the judgment unit 204 notifies an operation permission judgment to a notification unit 205.

On the other hand, to refuse reception of the operation, the judgment unit 204 notifies an operation refusal judgment to the notification unit 205 and to an operation reservation unit 209. The judgment unit 204 also transmits to the operation reservation unit 209 authentication information of the user whose operation has been refused to be received, together with operation setting contents.

In response to the determination result notified from the judgment unit 204, the notification unit 205 notifies the refusal or permission of reception of operation. When the result of judgment by the judgment unit 204 indicates that reception of operation has been refused, the notification unit 205 gives the user whose operation has been refused to be received a notification stating that reception of operation has been refused, a notification stating that reservation of operation will be acceptable, and other notifications.

The operation reservation unit 209 registers, as operation reservation information, the user authentication information and the operation setting contents both notified from the operation permission judgment unit 204 into an operation reservation information table in the RAM 232 so as to correspond to the order of reservation.

FIG. 12B shows an example of the operation reservation information table. As shown in FIG. 12B, the operation reservation information table 600 has a reservation order field 601, a user ID field 602, and a reserved operation field 603. A job name such as "COPY" or "FAX" is stored in the reserved operation field 603. It should be noted that the contents registered in the information table 600 are not limited to those of the illustrated example, but can include information representing the date and time of reception of reservation, for example.

The job execution unit 208 shown in FIG. 5 executes a predetermined job according to operation setting information notified from the operation reception unit 202, and after completion of execution of the job, transmits a job completion notification to the operation reservation unit 209.

When receiving the job completion notification from the job execution unit 208, the operation reservation unit 209 notifies the notification unit 205 of a user ID of a user who is first in the reservation order, among users each waiting for the arrival of reservation, while referring to the operation reservation information table 600. In response to the notification from the operation reservation unit 209, the notification unit 205 gives a notification of arrival of reservation order through the communication control unit 201 to the portable terminal 10 of the user who is first in the reservation order.

It should be noted that the software structure of the image forming apparatus 20 is not limited to that shown in FIG. 5, but may be one capable of selectively receiving operation setting requests from plural users based on user information and contents of operation setting, and notifying each user of a result of selective request reception, thereby enabling users whose operations have been refused to be received to make operation reservation. Part of the functions of the software structure of the image forming apparatus 20 can be provided by another information processing apparatus connected to the image forming apparatus 20.

Next, a description will be given of an operation reception process executed by the image forming apparatus 20.

Figure 6:
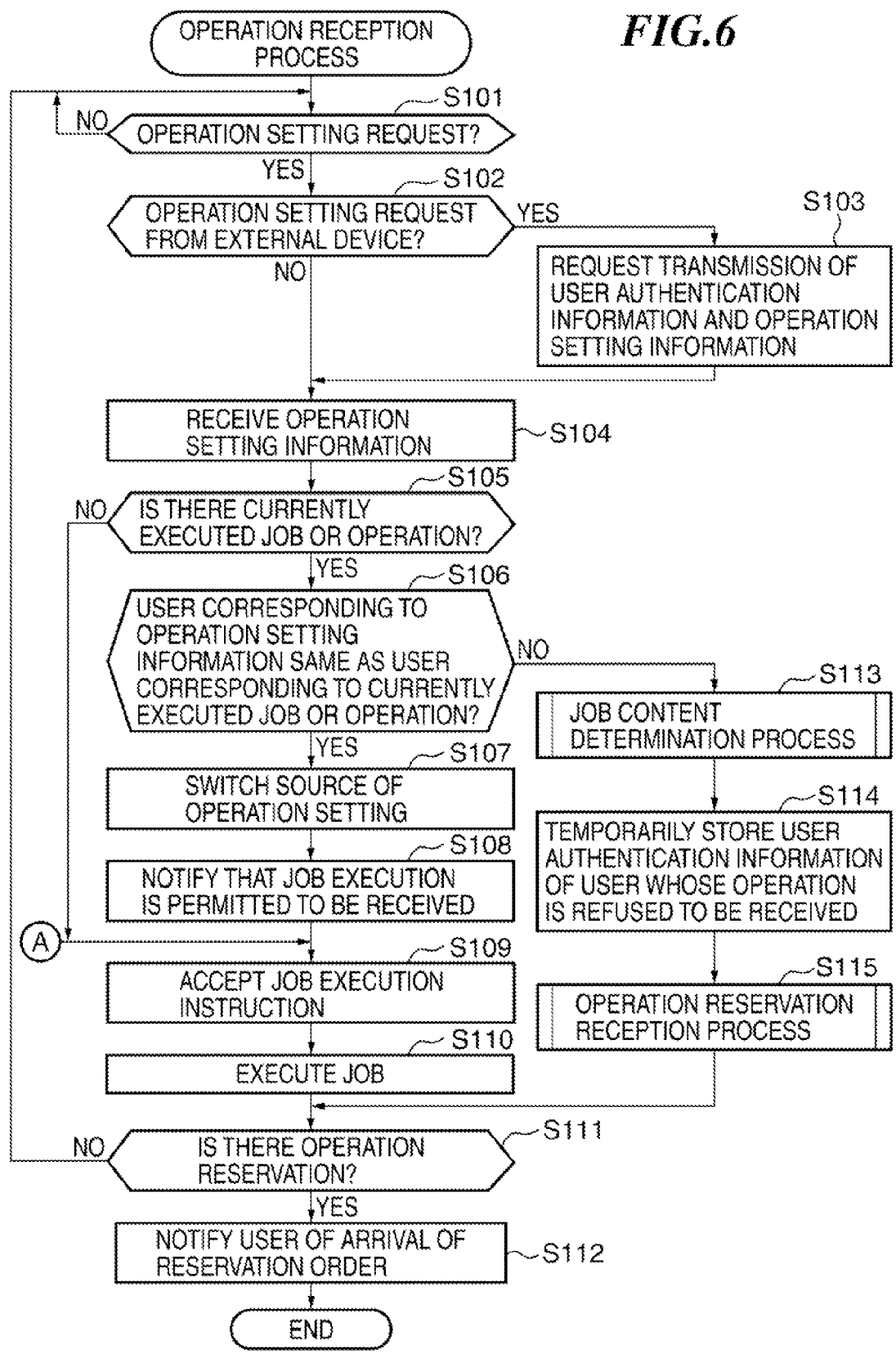
FIG. 6 is a flowchart showing procedures of the operation reception process executed by the image forming apparatus.

FIG. 6 shows, in flowchart, procedures of the operation reception process executed by the image forming apparatus 20. This process is executed by the software modules 201 to 209 of the image forming apparatus 20, and realized substantially by the CPU 231 by executing an operation reception program stored in the HDD 238 and read out to the RAM 232.

In the operation reception process, the operation reception unit 202 first determines whether or not there is an operation setting request (step S101) and if the answer to step S101 is NO, waits for reception of an operation setting request. If determined that there is an operation setting request (YES to step S101), the operation reception unit 202 determines whether or not the operation setting request is a request received from an external device (portable terminal 10 in this example) (step S102).

If determined that the operation setting request has been received from the portable terminal 10 (YES to step S102), the operation reception unit 202 transmits to the portable terminal 10 a request for transmission of user authentication information and operation setting information (step S103), and proceeds to step S104. In step S104, the operation reception unit 202 receives operation setting information from the portable terminal 10. The user authentication unit 206 authenticates a user corresponding to the operation setting information received by the unit 202, and transmits to the user determination unit 207 user authentication information representing a result of the authentication.

On the other hand, if determined that the operation setting request is not a request received from the portable terminal 10 (NO to step S102), the operation reception unit 202 accepts operation setting information input through the operation of the operation unit 250 of the image forming apparatus 20, and the user authentication unit 206 authenticates a user corresponding to the operation setting information and transmits user authentication information to the user determination unit 207 (step S104).

Next, in step S105, the operation reception unit 202 determines whether or not there is a currently executed job or operation. If determined that there is a currently executed job or operation, the flow proceeds to step S106.

In step S106, the user determination unit 207 determines based on the user authentication information received from the user authentication unit 206 whether or not the user corresponding to the currently executed job or operation and the user corresponding to the job or operation represented by the operation setting information subsequently received are the same as each other. If determined in step S106 that the current user and the subsequent user are the same as each other, the user determination unit 207 notifies the operation permission judgment unit 204 to that effect. Then, the flow proceeds to step S107.

In step S107, the operation reception unit 202 determines that different operation units are sequentially operated by the same user to make operation settings, and switches the source of operation setting from the operation unit first operated by the user (the operation unit 250 in this example) to the operation unit subsequently operated by the user (the portable terminal 10 in this example). As a result, the operation reception unit 202 can accept the operation setting information input through the operation of the operation unit currently operated by the user (portable terminal 10). In step S107, the operation reception unit 202 serves as an example of operation switch unit.

Next, in step S108, the operation reception unit 202 notifies the operation unit after the switch in step S107 that job execution is permitted to be received, and proceeds to step S109. The flow also proceeds to step S109, if the answer to step S105 is NO, i.e., if determined by the operation reception unit 202 that there is no currently executed job or operation.

In step S109, the operation reception unit 202 accepts a job execution instruction from the operation unit whose operation is permitted. The job execution instruction includes an instruction given by pressing the start key 252 on the operation unit 250 and a job execution instruction supplied from the portable terminal 10.

When the job execution instruction is supplied from the operation unit whose operation is permitted, the job execution unit 208 executes a job based on operation setting contents accepted by the unit 208 (step S110), and gives a job completion notification to the operation reservation unit 209 when the job execution is completed.

In response to the job completion notification, the operation reservation unit 209 determines whether or not there is an operation reservation, while referring to the operation reservation information table 600 (step S111). If determined that there is no operation reservation, the flow returns to step S101. On the other hand, if determined that there is an operation reservation, the notification unit 205 gives, via the communication control unit 201, a notification indicating arrival of reservation order to the portable terminal 10 of the user by whom the operation reservation has been made (step S112), whereupon the present process is completed.

If the answer to step S106 is NO, i.e., if determined that the current user and the subsequent user are not the same as each other, the user determination unit 207 notifies the operation permission judgment unit 204 to that effect. Then, the flow proceeds to step S113 where a job content determination process shown in detail in FIG. 8 is executed.

Figure 8:
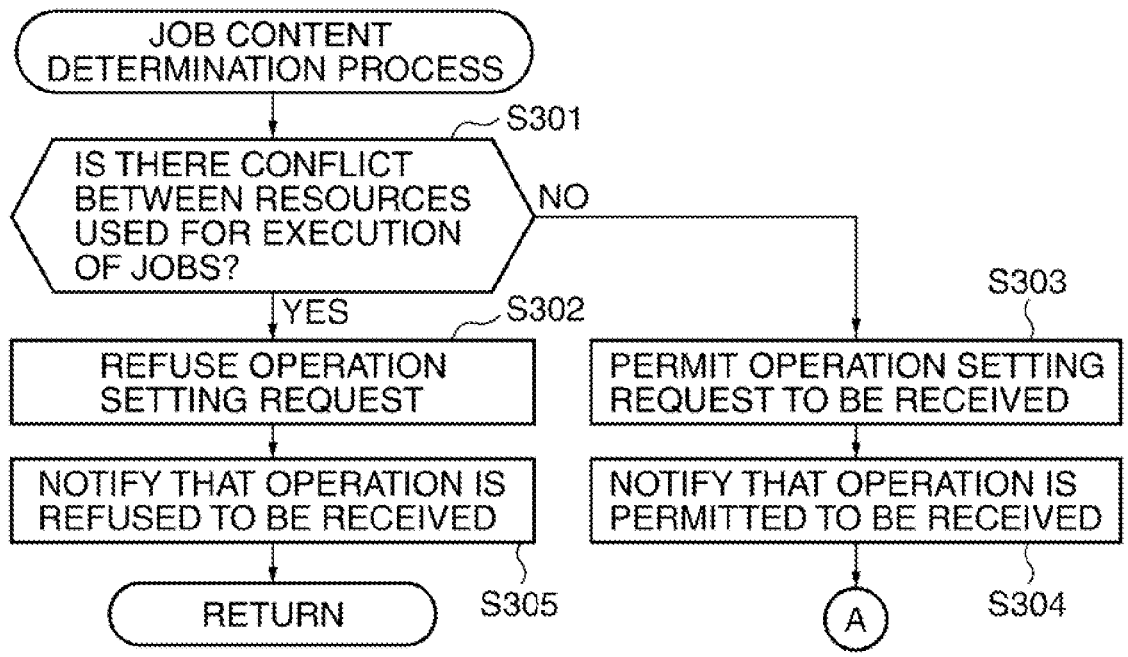
FIG. 8 is a flowchart showing the details of a job content determination process executed in step S113 of the operation reception process of FIG. 6.

In step S301 of the job content determination process in FIG. 8, the job content determination unit 203 determines, based on the operation setting information for the currently executed job or operation and the operation setting information for the subsequent job or operation, whether or not a conflict occurs between resources of the image forming apparatus that are used for execution of the two jobs, while referring to the conflict relationship determination table shown in FIG. 12A. If determined that no conflict occurs between the resources used to execute the two jobs, the job content determination unit 203 transmits to the operation permission judgment unit 204 a determination result that operation is permitted to be received.

Based on the result of determination by the user determination unit 207 about user authentication and the result of determination by the job content determination unit 203 about resource conflict, the operation permission judgment unit 204 determines that the users corresponding to the two jobs are not the same as each other and no conflict occurs between resources of the image forming apparatus that are used for execution of these jobs, and permits the operation setting request to be received (step S303). Then, the unit 204 notifies an operation permission judgment to the notification unit 205. The notification unit 205 gives a notification indicating that the operation is permitted to be received to the portable terminal 10 via the communication control unit 201 (step S304), whereupon the flow proceeds to step S109 in FIG. 6. It should be noted that the notification indicating the permission of reception of operation can be omitted.

If the answer to step S301 is YES, i.e., if determined that a conflict occurs between the resource used for execution of the currently executed job or operation and the resource used for execution of the subsequent job or operation, the job content determination unit 203 notifies the operation permission judgment unit 204 of a result of determination that the operation is refused to be received. Based on the result of determination by the user determination unit 207 about user authentication and the result of determination by the job content determination unit 203 about resource conflict, the operation permission judgment unit 204 determines that the users respectively corresponding to the two jobs are not the same as each other and a conflict occurs between resources of the image forming apparatus, and refuses the operation setting request (step S302).

Next, the operation permission judgment unit 204 notifies an operation refusal judgment to the notification unit 205. The unit 205 gives a notification that the operation is refused to be received to the portable terminal 10 via the communication control unit 201 (step S305). Then, the flow proceeds to step S114 in FIG. 6.

In step S114, the user determination unit 207 temporarily stores the user authentication information of the user whose operation has been refused to be received in the job content determination process of step S113. Then, the flow proceeds to step S115 where an operation reservation reception process shown in detail in FIG. 9 is executed.

Figure 9:
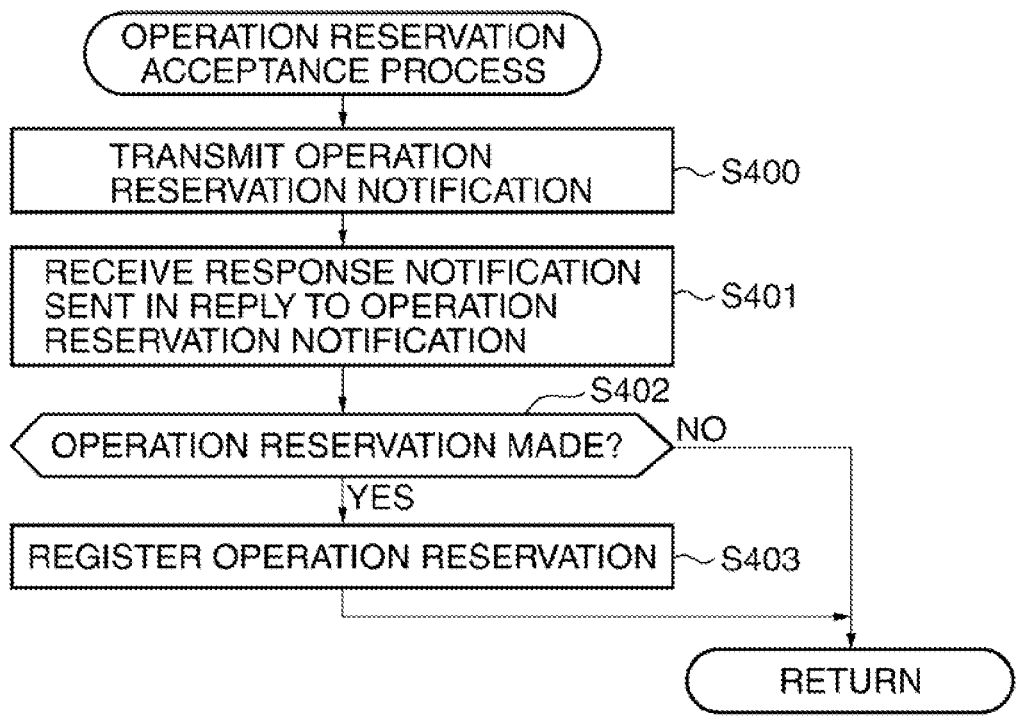
FIG. 9 is a flowchart showing the details of an operation reservation reception process executed in step S115 of the operation reception process of FIG. 6.

In the operation reservation reception process of FIG. 9, the operation reservation unit 209 transmits, via the communication control unit 201, etc., an operation reservation notification to the portable terminal 10 of the user whose operation has been refused to be received in the job content determination process in step S113, to thereby inquire as to whether the user will make an operation reservation (step S400).

Next, the operation reservation unit 209 receives a response notification sent in reply to the operation reservation notification transmitted in step S400 (step S401), and based on the response notification, determines whether or not the operation reservation has been made (step S402). If the answer to step S402 is NO, the flow proceeds to step S111 of FIG. 6.

On the other hand, if the answer to step S402 is YES, the operation reservation unit 209 registers the user authentication information temporarily stored in step S114 of FIG. 6 and a job name relating to the operation reservation made by the user whose operation has been refused to be received into the operation reservation information table 600 so as to correspond to the reservation order, thereby registering the operation reservation (step S403), whereupon the flow proceeds to step S111 in FIG. 6.

Next, a description will be given of the flow of an operation setting request process executed by the portable terminal 10.

Figure 7:
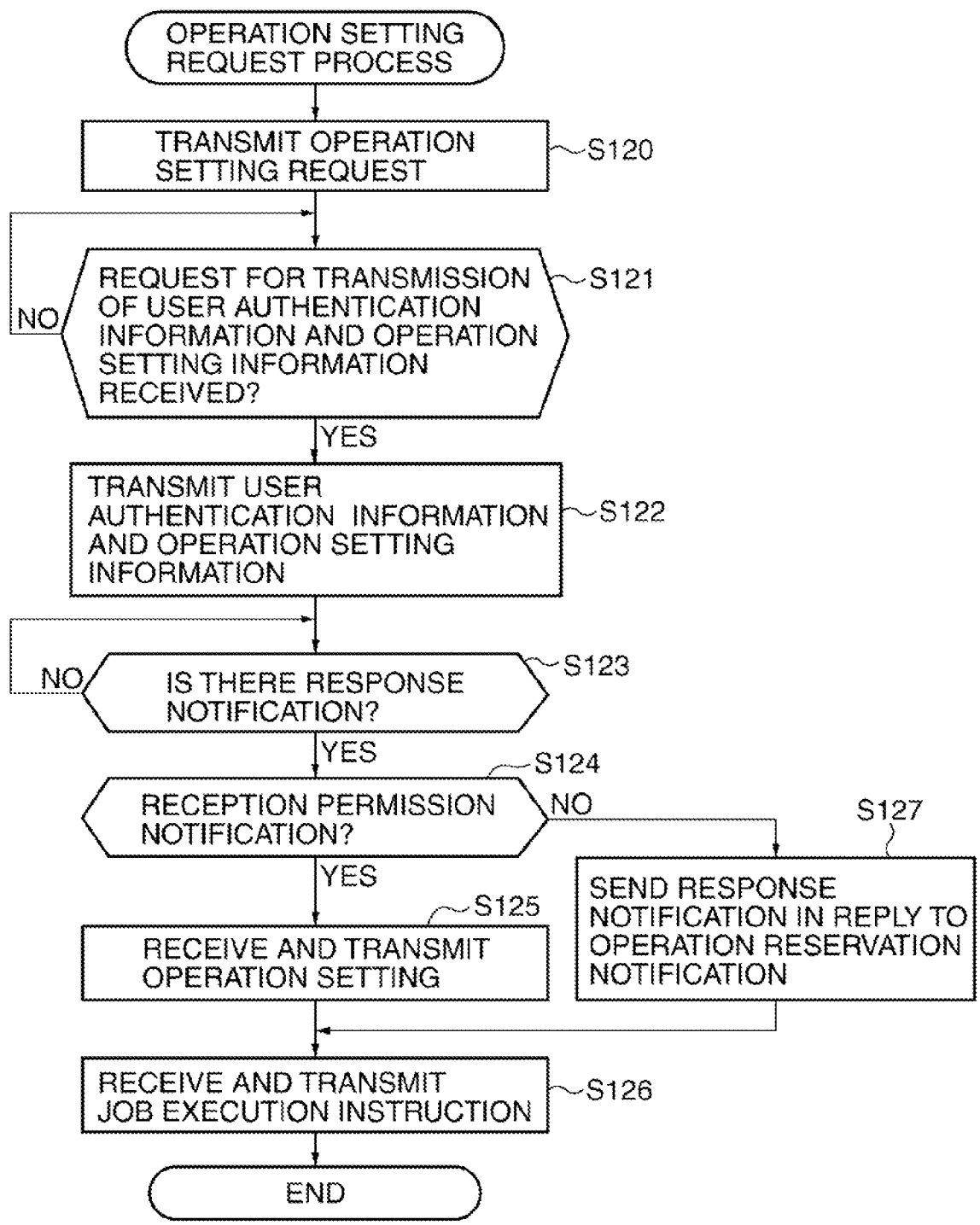
FIG. 7 is a flowchart showing procedures of an operation setting request process executed by the portable terminal.

FIG. 7 shows in flowchart the procedures of the operation setting request process executed by the portable terminal 10. This process is realized by the CPU 101 of the portable terminal 10 by executing an operation setting request program stored in the HDD 104 and read out to the RAM 102.

The CPU 101 of the portable terminal 10 transmits an operation setting request to the image forming apparatus 20 (step S120), and determines whether or not it receives from the image forming apparatus 20 a request for transmission of user authentication information and operation setting information (step S121). If the answer to step S121 is NO, the CPU 101 waits for reception of a transmission request. On the other hand, if the answer to step S121 is YES, the CPU 101 transmits user authentication information and operation setting information to the image forming apparatus 20 (step S122), and determines whether or not a response notification is received from the image forming apparatus 20 (step S123).

The response notification includes a notification indicating that the operation is permitted to be received, a notification indicating that the operation is refused to be received, and a notification indicating that job execution is permitted to be received, which are given from the image forming apparatus 20 in steps S304 and S305 of the job content determination process of FIG. 8 and in step S108 of FIG. 6, respectively. If determined in step S123 that the response notification is received, the flow proceeds to step S124.

In step S124, the CPU 101 determines whether or not the response notification received from the image forming apparatus 20 is an operation reception permission notification or a job execution reception permission notification. If the answer to step S124 is NO, i.e., if determined that the response notification is neither the operation permission notification nor the job execution reception permission notification, the flow proceeds to step S127.

In step S127, the CPU 101 sends a response notification in reply to the operation reservation notification transmitted from the image forming apparatus 20 in step S115 of FIG. 6 (i.e., in the operation reservation reception process of FIG. 9), whereby the operation reservation is set in the image forming apparatus 20. Then, the flow proceeds to step S126.

If the answer to step S124 is YES, i.e., if determined that the response notification sent from the image forming apparatus 20 in reply to the user authentication information and the operation setting information transmitted in step S122 is the operation permission notification or the job execution reception permission notification, the CPU 101 receives the operation setting for job execution and transmits the operation setting to the image forming apparatus 20 (step S125).

When a user's job execution instruction is received by the operation unit 107, the CPU 101 transmits the job execution instruction to the image forming apparatus 20 (step S126), thereby completing the operation setting request process.

As described above, in step S104 of the operation reception process of FIG. 6, the image forming apparatus 20 receives the operation setting information input by the user through the operation unit 250 of the image forming apparatus or through the portable terminal 10 and performs user authentication. In step S122 of the operation setting request process of FIG. 7, the portable terminal 10 transmits user authentication information and operation setting information input by the user to the image forming apparatus 20.

In this manner, operation input is made by the user in relation to steps S104 and S122. A user authentication screen and an operation setting reception screen for receiving the operation input by the user are displayed on the operation unit 250 of the image forming apparatus 20 or on the operation unit 107 of the portable terminal 10.

Figure 10A:
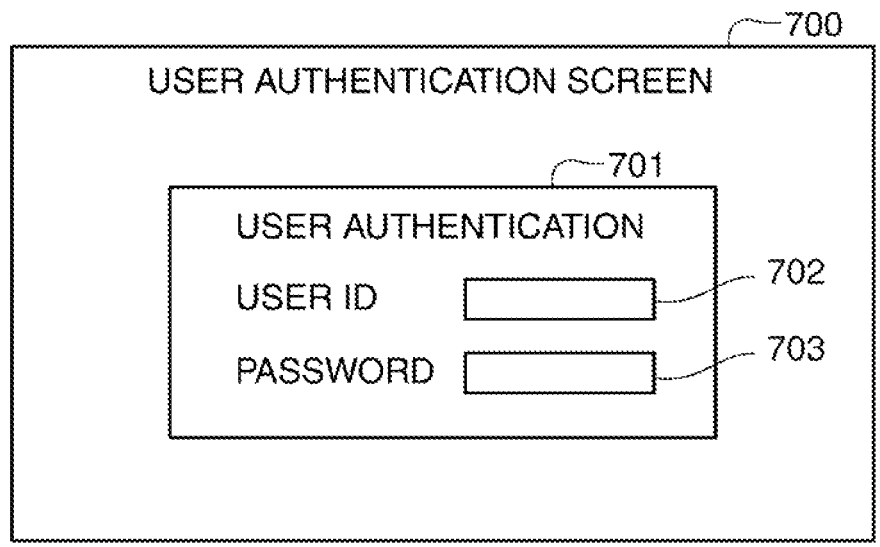
FIG. 10A is a view showing an example of a user authentication screen displayed on an operation unit of the image forming apparatus or on an operation unit of the portable terminal in relation to the operation reception process or the operation setting request process.
Figure 10B:
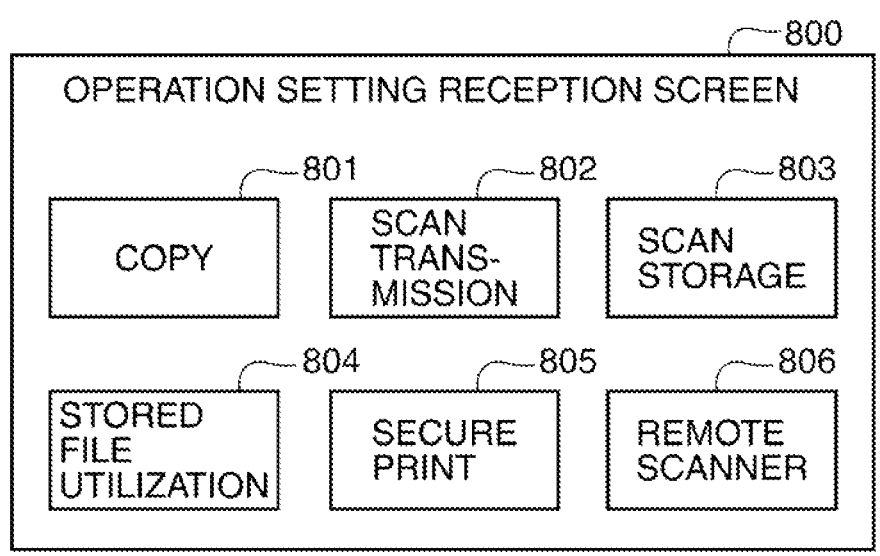
FIG. 10B is a view showing an example of an operation setting reception screen displayed on the operation unit of the image forming apparatus or on the operation unit of the portable terminal in relation to the operation reception process or the operation setting request process.

FIG. 10A shows an example of the user authentication screen, and FIG. 10B shows an example of the operation setting reception screen.

In FIG. 10A, reference numeral 700 denotes the user authentication screen displayed on the operation unit 250 of the image forming apparatus 20 or on the operation unit 107 of the portable terminal 10 in relation to step S104 in FIG. 6 or step S122 in FIG. 7.

On the user authentication screen 700, a user authentication reception field 701 is displayed that has a user ID input field 702 and a password input field 703 into which a user ID and a password that serve as user authentication information are input by the user. Although the user ID and the password are utilized as user authentication information in this embodiment, this is not limitative.

In FIG. 10B, reference numeral 800 denotes the operation setting reception screen displayed on the operation unit 250 of the image forming apparatus 20 or on the operation unit 107 of the portable terminal 10.

On the operation setting reception screen 800, there are displayed buttons each for selecting a function desired by the user. In the illustrated example, a copy button 801, a scan transmission button 802, a scan storage button 803, a stored file utilization button 804, a secure print button 805, and a remote scanner function selection button 806 are displayed on the screen 800.

A user's operation input relating to step S104 of FIG. 6 and step S122 of FIG. 7 are received via the operation setting reception screen 800. For example, when the copy button 801 on the screen 800 displayed in relation to step S104 is pressed, the operation reception unit 202 determines in step S105 that there is no currently executed job or operation, and displays a copy function detail setting screen (not shown) in step S109 and receives a job execution instruction.

Figure 11A:
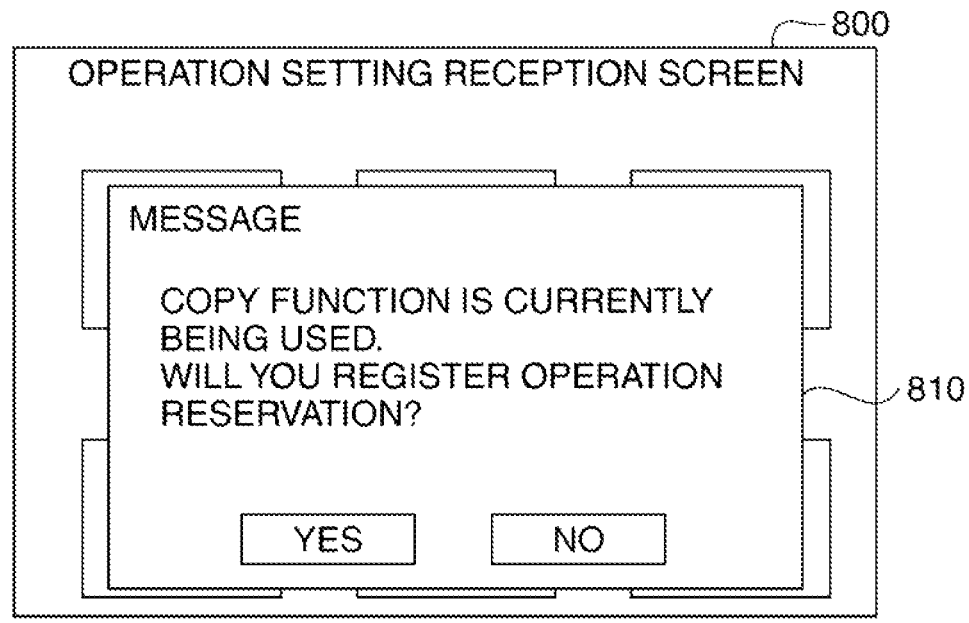
FIG. 11A is a view showing an example of a notification message displayed on an operation setting reception screen to indicate a result of determination about a conflict between resources of the image forming apparatus that are respectively used to execute two jobs.

As described above, it is determined in the job content determination process of FIG. 8 or in step S113 of the operation reception process of FIG. 6 whether or not there is a conflict between resources respectively used to execute the currently executed job or operation and the subsequent job or operation, and a determination result is notified to the portable terminal 10. When there is a resource conflict, a notification message 810 shown in FIG. 11A or the like is displayed on the operation setting reception screen 800. The notification message 810 is e.g. a pop-up window that indicates a determination result about resource conflict and a request for selection of whether to make an operation reservation or not.

Figure 11B:
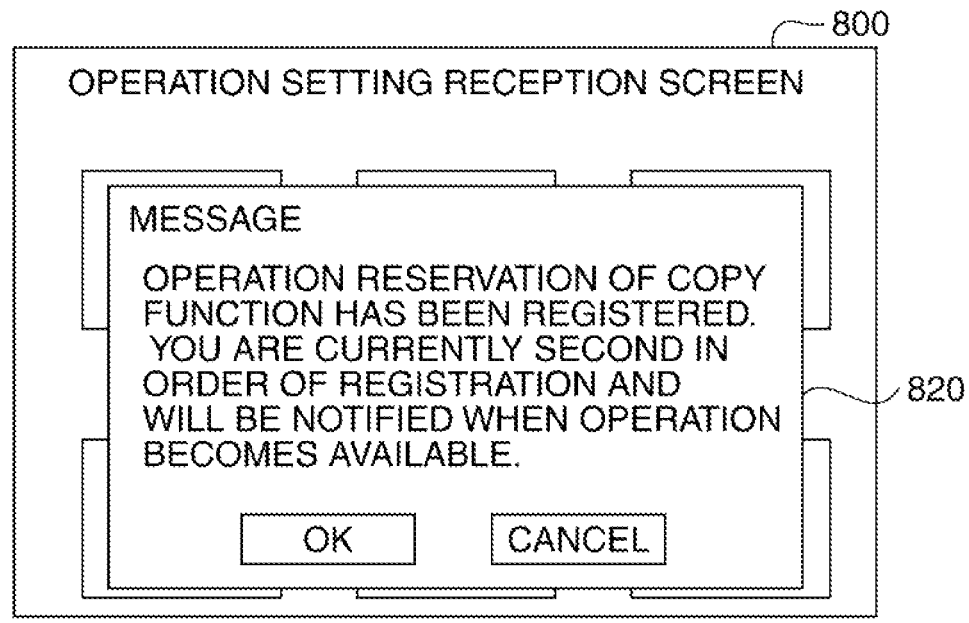
FIG. 11B is a view showing an example of a notification message of operation reservation registration displayed on the operation setting reception screen.

When the user presses a "YES" button on the notification message 810 to select making an operation reservation, a notification message 820 of operation reservation registration is displayed on the screen 800 as shown in FIG. 11B. The notification message 820 at least includes an indication that operation reservation has been registered and an indication of order of registration. The order of registration displayed at the registration is updated upon completion of each of jobs to be executed in the image forming apparatus 20, thereby enabling the user to confirm the current order of registration.

It should be noted that the operation setting reception screen is not limited to the screen 800 of the illustrated example, but may be one at least capable of performing user authentication, selecting a desired function, making a response when the operation is refused to be received, and performing an operation for operation reservation.

According to this embodiment, in an environment where the image forming apparatus can be simultaneously accessed from a plurality of portable terminals that can be utilized as external operation units, an operation setting request from a user who first uses the image forming apparatus and an operation setting request from a user who attempts to subsequently use the image forming apparatus are compared to each other, thereby determining whether or not there is a conflict between resources of the image forming apparatus that are used for execution of jobs respectively corresponding to both the operation setting requests and also determining whether or not these users are the same as each other.

If determined that both the users are not the same as each other and there is a conflict between resources used to execute these jobs, the subsequently received operation setting request is refused. It is therefore possible to execute apparatus functions corresponding to the operation setting requests in the order of reception, while taking into account of the presence and absence of a conflict between the operation setting requests, even if a plurality of operation setting requests are received from the operation unit of the image forming apparatus and/or from the external operation unit such as the portable terminal.

In the above-described embodiment, the portable terminal 10 may be a dedicated terminal that can only be utilized as an external operation unit or may be a general-purpose terminal such as a smart phone, cellar phone, or tablet PC. Although a case has been described in the embodiment where the image forming apparatus 20 is implemented by a multi-function peripheral, the image forming apparatus may be implemented by a printer or a facsimile machine that has a communication function.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2012-146877, filed Jun. 29, 2012, which is hereby incorporated by reference herein in its entirety.

What is claimed is:

1. An image forming apparatus that receives operation settings set through a plurality of operation units and executes jobs, comprising:
   a non-transitory memory device;
   a processor;
   a user determination unit configured, in a case where it receives a plurality of operation settings from the plurality of operation units, to determine whether or not a plurality of users who have set the plurality of operation settings are the same as one another;
   an operation setting determination unit configured to determine whether or not the plurality of operation settings are in a conflict relationship with one another; and
   an operation permission judgment unit configured to determine, based on a result of the determination by said user determination unit and a result of the determination by said operation setting determination unit, whether or not each of the received operation settings should be permitted,
   wherein in a case where said user determination unit determines that the plurality of users who have set the plurality of operation settings are not the same as one another and said operation setting determination unit determines that the plurality of operation settings are in a conflict relationship with one another, said operation permission judgment unit refuses each of at least one subsequently received operation setting, and
   wherein said user determination unit, said operation setting determination unit, and said operation permission judgment unit are implemented at least in part by said processor executing at least one program recorded on said non-transitory memory device.

2. The image forming apparatus according to claim 1, further including:
   an operation reservation unit configured to register a reservation of the operation setting refused by said operation permission judgment unit, wherein said operation permission judgment unit accepts, according to order of reservation, the operation setting whose reservation has been registered by said operation reservation unit, and wherein said operation reservation unit is implemented at least in part by the processor executing at least one program recorded on the non-transitory memory device.

3. The image forming apparatus according to claim 1, wherein said operation setting determination unit determines whether or not there is a conflict in at least one of hardware resources and software resources of the image forming apparatus that are used when jobs are executed based on the plurality of operation settings, thereby determining whether or not the plurality of operation settings are in a conflict relationship with one another.

4. The image forming apparatus according to claim 1, further including:
 a user authentication unit configured to perform authentication based on user authentication information input from each of the operation units,
 wherein said user determination unit determines, based on user authentication information of users authenticated by said user authentication unit, whether or not the plurality of users who have set the plurality of operation settings are the same as one another, and
 wherein said user authentication unit is implemented at least in part by the processor executing at least one program recorded on the non-transitory memory device.

5. The image forming apparatus according to claim 2, further including:
 a notification unit configured to notify a result of the determination by said operation permission judgment unit to the users who have set the operation settings,
 wherein said notification unit notifies each of at least one user whose operation setting has been refused by said operation permission judgment unit of an inquiry as to whether the user wishes to register a reservation of the operation setting, and
 wherein said notification unit is implemented at least in part by the processor executing at least one program recorded on the non-transitory memory device.

6. The image forming apparatus according to claim 1, further including:
 an operation switch unit configured, in a case where said user determination unit determines that the plurality of users who have set the plurality of operation settings are the same as one another, to switch a source of operation setting from a first operated operation unit to a subsequently operated operation unit, and
 wherein said operation switch unit is implemented at least in part by the processor executing at least one program recorded on the non-transitory memory device.

7. A control method for an image forming apparatus that receives operation settings set through a plurality of operation units and executes jobs, comprising:
 a user determination step, in a case where a plurality of operation settings are received from the plurality of operation units, of determining whether or not a plurality of users who have set the plurality of operation settings are the same as one another;
 an operation setting determination step of determining whether or not the plurality of operation settings are in a conflict relationship with one another; and
 an operation permission judgment step of determining, based on a result of the determination in said user determination step and a result of the determination in said operation setting determination step, whether or not each of the received operation settings should be permitted,
 wherein in a case where it is determined in said user determination step that the plurality of users who have set the plurality of operation settings are not the same as one another and it is determined in said operation setting determination step that the plurality of operation settings are in a conflict relationship with one another, each of at least one subsequently received operation setting is refused in said operation permission judgment step.

8. A non-transitory computer-readable storage medium storing a program for causing a computer to execute a control method for an image forming apparatus that receives operation settings set through a plurality of operation units and executes jobs, the method comprising:
 a user determination step, in a case where a plurality of operation settings are received from the plurality of operation units, of determining whether or not a plurality of users who have set the plurality of operation settings are the same as one another;
 an operation setting determination step of determining whether or not the plurality of operation settings are in a conflict relationship with one another; and
 an operation permission judgment step of determining, based on a result of the determination in said user determination step and a result of the determination in said operation setting determination step, whether or not each of the received operation settings should be permitted,
 wherein in a case where it is determined in said user determination step that the plurality of users who have set the plurality of operation settings are not the same as one another and it is determined in said operation setting determination step that the plurality of operation settings are in a conflict relationship with one another, each of at least one subsequently received operation setting is refused in said operation permission judgment step.

* * * * *